Oct. 30, 1934.  G. B. EGGERT  1,978,490
MIXER
Filed Feb. 1, 1932   2 Sheets-Sheet 1

Inventor
Gustav B. Eggert
By George B. Willcox
Attorney

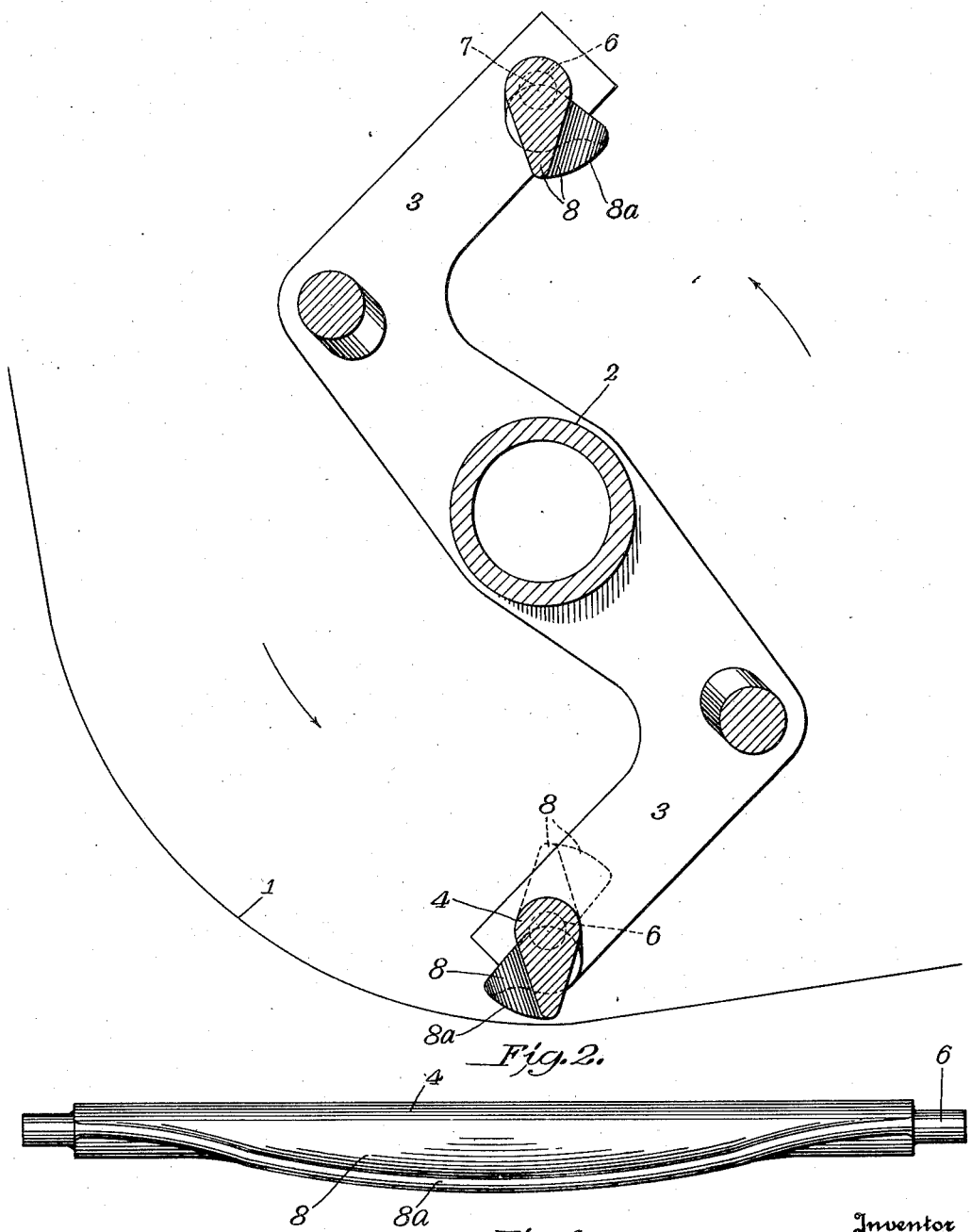

Patented Oct. 30, 1934

1,978,490

UNITED STATES PATENT OFFICE 1,978,490

MIXER

Gustav B. Eggert, Saginaw, Mich., assignor to Baker Perkins Company, Inc., Saginaw, Mich., a corporation of New York Application February 1, 1932, Serial No. 590,016

5 Claims. (Cl. 259—109)

My invention relates to improvements in dough mixers and the like and pertains more particularly to an improved construction and arrangement of parts whereby new and advantageous results and actions upon the dough are produced. The invention is adapted for use in various known types of mixers although I shall here show and describe it installed in the mixer which is illustrated and described in detail in my Patent No. 1,763,292, issued June 10, 1930. The mixer consists of a trough having a part cylindrical bottom and a co-axial rotary worker or frame on which mixing and kneading elements are mounted parallel with the axis.

The present claimed subject matter resides in novel structure, arrangement, and mode of operation of the dough mixing and kneading unit or rung, sometimes termed the beater element.

The objects of the invention are: To provide a beater element reinforced so as to possess great strength and solidity, yet not unduly heavy.

Another object is to provide a rung or beater element that shall be reversible end for end, whereby blades of identical pattern can be used either for urging material toward the middle of the bowl, or for urging it from the middle toward the sides, or both, as may best suit the material being worked.

Another object is to provide a beater element that shall be capable of automatically positioning itself by means of centrifugal force so as best to stir and mix the loose aggregate materials during the early stages, and thereafter, under the influence of the material as it becomes tough and elastic, to change its position and mode of operation automatically from that best adapted for stirring to a new position that is best adapted for kneading and stretching. The time required to make a batch of dough is thereby shortened, overbeating is avoided and motive power is saved.

To ascertain the true nature and scope of my invention I shall first note a few of the general principles involved in the present problem.

Dough mixing is accomplished in two stages. The first stage is a premixing or hydrating period in which water is combined with flour and other ingredients. Hydration should be uniform, thorough and finished as quickly as possible so gluten development may commence evenly through the entire mass. In the second stage the dough, now a coherent mass, is stretched, kneaded, rolled and aerated to develop the gluten, and should be completed rapidly, efficiently, and with a minimum expenditure of power.

My invention is characterized by the fact that the beater element automatically changes its mode of operation when the material changes from fluid to plastic. While the material remains uncombined the working edge of the beater element travels quite close to the bottom of the trough and not only churns the loose material down and up and peripherally around the inside face of the trough, but also spreads and gathers it alternately toward and away from the middle, thus satisfying the requirement for most efficient stirring. Then, while the material changes in quality from semi-fluid to plastic and glutinous, the beater element automatically alters its working position in such a way as to plow through the mass at some distance above the bottom of the trough and thereby effectively beat, stretch, slap, and knead the mass without unduly driving it round and round in the trough.

In the drawings Fig. 1 is a front perspective view of a mixing and kneading trough with a rotary worker frame carrying two of my novel beater elements, one being shown at the top of the frame, the other at the bottom. The inverted position of the bottom blade is indicated by dotted lines.

Fig. 2 is an enlarged sectional view of the beater frame shown in Fig. 1, taken on line 2—2 of Fig. 1.

Fig. 4 is a view similar to Fig. 3, but showing the beater element turned end for end so as to act in the reverse mode.

Like reference characters indicate like parts in all the figures of the drawings.

The trough 1 contains the rotary frame 2 including the usual spaced supports or spiders 3, the frame having a driven connection with any suitable variable-speed power means, not shown.

Figure 1:
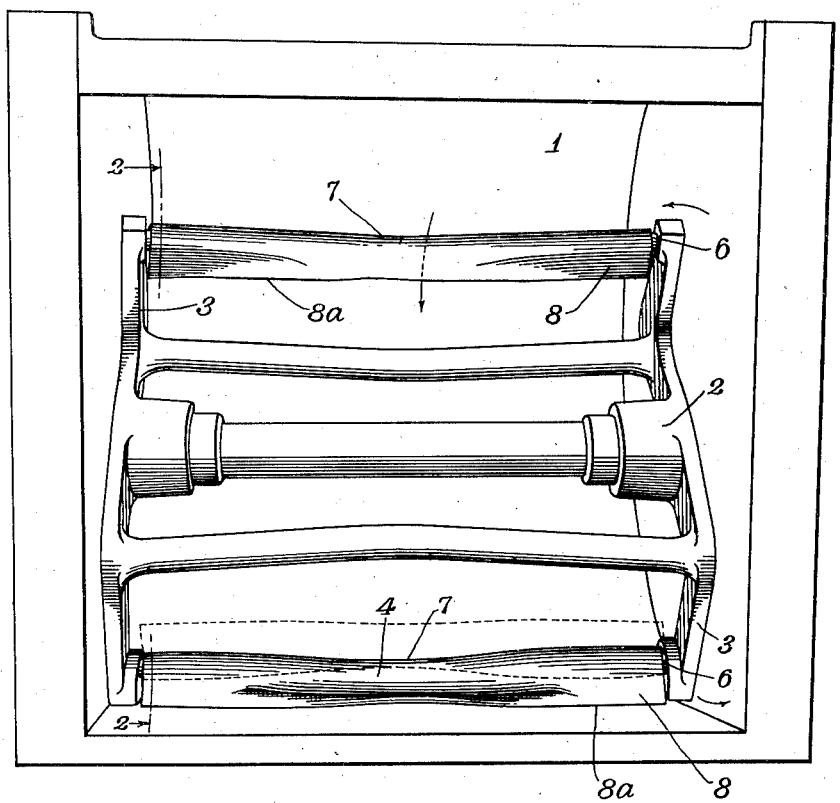
Figure 3:
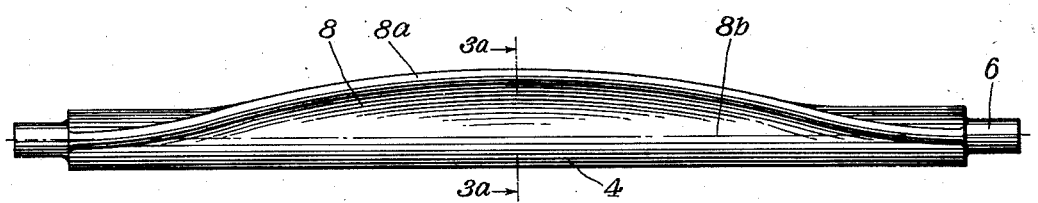
Fig. 3 is an enlarged view of the bottom blade in Fig. 1, as viewed from a ground plane below.
Figure 3A:
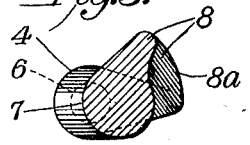
Fig. 3a is a cross section on line 3a—3a of Fig. 3.

The beater element or rung, Figs. 3 and 4, that embodies my invention may be conceived as made up of two components, namely, a main bar-like portion 4, its ends pivotally connected as at 6 to the supports 3, rotatable about its own axis. Bar-like component 4 of the rung may be straight, but preferably is bowed intermediate its ends to present a concave upper face 7 when resting normally pendent from its pivot 6, as shown in Fig. 1. The other component of the rung structure is a fin-like blade element 8 on the side of bar 4, preferably opposite the concave face 7. It extends lengthwise of the beater member 4 and projects therefrom substantially radially at all points of its length. It is preferably thickened at its base so as to merge into the shape of the bar-like component 4, as is shown in Figs. 2 and 3a.

Blade element 8 may be substantially flat sided, but preferably is of warped form so that at places along its length it has a curved outline 8a. Assuming the shape of a blade suitably warped to be projected on a ground plane, then if a straight line 8b is conceived to be drawn to represent its pivotal axis the edge 8a will appear as shown in Figs. 3 and 4. Since all parts of the edge 8a are equidistant from the axis 8b, it follows that if the blade is rotated about the axis its edge will describe a cylinder of revolution; also that the distance from the main axis of rotation of frame 2 to the edge 8a, in its outermost position, is everywhere the same and is equal to the radius of the circular part of trough 1 minus whatever working clearance between the blade edge 8a and the trough 1 may be required by conditions of use.

In the beginning, as stated, the blade works as a stirrer until it has puddled the supply of granular, powdered, and soft ingredients with water to a thick paste. During this early period of operation the blade tilts so as to drag its marginal working edge through or over the gradually uniting ingredients with a feathering or brush-like sweeping movement; the centrifugal force developed by the rotary speed determines the amount of stress exerted by the blade upon the material. In the early stage of mixing, the working edge of the blade, sweeps close to the trough and in passing through the slightly resistant unmixed ingredients effectually picks up and stirs all of them.

As the dough gradually becomes plastic and its resistance increases, the beater member 4 turns on its pivots and its blade element 8 trails behind. As the beater forces its way through the dough the centrifugal force and the varying resistance in different parts of the mass cause a new action of the blade element 8, which now flutters about its axis with a vibratory movement, forcefully slapping and beating the dough in its passage. Toward the end of the mixing operation the blade repeatedly throws the dough to the top of the mixer, the next approaching blade catches it, slaps it against the back of the trough, rolls it down the back and compresses it against the bottom. When the work is completed, the speed of rotation is reduced, the discharge door of the trough is opened, and with a few turns of the frame the finished charge is balled up and rolled out of the machine.

I have illustrated and described the preferred form of my improvement wherein the beater member 4 is bowed at 7, Fig. 1, and the working edge 8a of the blade element 8 is warped as shown in Fig. 3. The bowed structure 7 is preferable because it tends to draw the dough from the ends of the trough up toward the middle during the kneading action; and the warped or curved structure of the blade as shown at 8a in Fig. 3 is preferred because it has a like effect on the loose ingredients during the early stage of mixing. It is clear, however, that if desired the bowed portion 7 may be straight instead of bowed and the blade element may be flat instead of warped and still retain certain of the inherent advantages of operation that are characteristic of my invention.

In practice one or both of the blades may be mounted in the position shown in Fig. 3, or one or both may be mounted as shown in Fig. 4, depending upon the nature of the work. If one is mounted as in Fig. 3, and the other as in Fig. 4, then one blade tends to spread the material from the middle of the trough toward the end and the other tends to draw it from the ends toward the middle, which has advantages in certain classes of work.

My invention combines the advantageous features of both the known non-rotatable curved blades and the straight roller blades heretofore employed in mixers of the class described. It accomplishes new results not possible with either of the other blades, namely, uniform working of the dough during all stages of mixing, low heat development, better aeration, less cutting of the dough, greater slapping and beating effect, and more rapid mixing.

In the appended claims I have pointed out the essential elements of my invention, it being understood, however, that the claims are not intended to be limited to the form of the parts illustrated and described further than a limitation to the described form is necessary to distinguish them from the prior art.

Having thus described my invention, what I claim and desire to secure by Letters Patent is:

1. A mixer having in combination a trough, a worker rotatable therein including spaced supports, and beater members or rungs extending between said supports and pivotally connected thereto at their ends, each beater member being bowed intermediate its ends to present a concave face and including a blade element disposed lengthwise of the beater member and projecting substantially radially therefrom at the side opposite said concave face and shaped to present a curved outline from a straight line on a ground plane, all parts of the longitudinal edge of said blade element being equidistant from the axis of said pivotal connection.

2. A beater element adapted for use on the rotary frame of a mixing machine, having pivotal connections at its ends to said frame, the part intermediate said ends being bowed, and a blade element extending lengthwise said beater element and projecting substantially radially therefrom, all parts of the longitudinal edge of said blade element being equidistant from the axis of rotation of said pivotal connections.

3. A bowed beater member adapted for pivotal suspension at its ends and a blade element associated therewith and projecting therefrom in substantially radial directions, said blade element being shaped to define a curved outline from a straight line on a ground plane, the outer longitudinal margin of the blade element being substantially equidistant from the pivotal axis throughout its length.

4. A bowed beater member adapted for pivotal suspension at its ends and a blade element associated therewith and projecting therefrom in substantially radial directions, said blade element being shaped to define a curved outline from a straight line on a ground plane.

5. A bowed beater presenting a concave face and adapted for pivotal suspension at its ends and a blade element associated with said beater and projecting therefrom substantially radially at the side opposite said concave face.

GUSTAV B. EGGERT.